United States Patent [19]

Sprung

[11] Patent Number: 4,833,825
[45] Date of Patent: May 30, 1989

[54] SYSTEM FOR SUPPORTING GROWING PLANTS

[76] Inventor: Philip D. Sprung, c/o 1001 - 10th Ave. SW., Calgary, Alberta, Canada, T2R 0B7

[21] Appl. No.: 947,641

[22] Filed: Dec. 30, 1986

[51] Int. Cl.⁴ ............................................. A01G 31/00
[52] U.S. Cl. .......................................... 47/62; 47/48.5
[58] Field of Search ................ 47/59, 60, 61, 62, 48.5, 47/39

[56] References Cited

U.S. PATENT DOCUMENTS

| | | | |
|---|---|---|---|
| 1,336,307 | 4/1920 | London | 47/39 |
| 3,603,034 | 9/1971 | Maxwell-Stewart | 47/79 |
| 4,035,950 | 7/1977 | Anselm | 47/59 |
| 4,118,891 | 10/1978 | Kehl et al. | 47/59 |
| 4,603,506 | 8/1986 | Powell, Jr. | 47/62 |

FOREIGN PATENT DOCUMENTS

| | | | |
|---|---|---|---|
| 2748010 | 4/1978 | Fed. Rep. of Germany | 47/59 |
| 2056833 | 3/1981 | United Kingdom | 47/59 |
| 2101863 | 1/1983 | United Kingdom | 47/59 |

Primary Examiner—Robert A. Hafer
Assistant Examiner—Lynda M. Cofsky
Attorney, Agent, or Firm—Kenyon & Kenyon

[57] ABSTRACT

There is provided a new and useful support system for growing plants comprising a supporting framework; at least one elongated support tray on the framework, the support tray having feeding and catchment ends and comprising a channel shape of substantially horizontal transverse profile and with upstanding elongate sides; and having at least one longitudinal depression extending the length of the bottom of the tray; a catchment tray supported to extend below the catchment end of at least one support tray, the catchment tray including an outlet; and wherein at least one support tray is sloped downwardly from the feed end to the catchment end.

22 Claims, 5 Drawing Sheets

SYSTEM FOR SUPPORTING GROWING PLANTS

This application relates to a system for supporting Plants which are being grown utilizing a nutrient film propagation technique.

BACKGROUND OF THE INVENTION

Limited amounts of arable land and adverse environmental conditions, whether natural or man made, have resulted in the use for many years of closed environment structures. These have for the most part been greenhouses of the most basic type. However, over the years methods of plant husbandry and improved structures of the greenhouse type have been constantly under development.

One relatively recent advance in controlled environment husbandry has been the use of nutrient film techniques. In general terms these techniques involve the contacting of the bottom of a plant root system with a thin stream of nutrient solution. The solution soaks up through the remainder of the root system by wicking or capillary action. A great many external influences affect the relatively sensitive nutrient film technique. Efforts are now underway to control various of these influences to improve both the technical aspects and the economics of the systems.

It is in this context that the present invention arises. The physical structure for supporting plants being propagated in accordance with nutrient film techniques has hereby been substantially improved from both the technical and economic points of view. A substantial technical problem in respect of nutrient film plant propagation has been the difficulty of ensuring that the nutrient film is in more or less equal contact with all of the plants to which it is directed. This is one of a number of aspects of nutrient flow which have required improvement.

The present invention provides a system in which there is a very high likelihood that the nutrient solution will adequately contact all of the root system. In addition to achieving the desired technical improvement, this system offers substantial economic advantages over earlier systems.

PRIOR ART

Canadian Patent No. 1,097,075, issued Mar. 10, 1981. to Control Data Corporation, deals with nutrient film systems and in particular with regulators for the nutrient feed. That patent does not deal in any substantial way with detail of the apparatus apart from the regulator.

Applicant is not aware of other specific art which is of relevance to the present case.

SUMMARY OF THE INVENTION

The applicant has developed a support system for nutrient film plant propagation which includes a unique tray structure for support of the plants, along with a frame structure for support of the trays. These structures combine with the growth container to provide a system of superior performance and relatively lower cost.

Accordingly, the invention provides a support system for growing plants comprising a supporting framework; at least one elongated support tray on the framework, the support tray having feeding and catchment ends and comprising a channel shape of substantially horizontal transverse profile and with upstanding elongate sides; and having at least one longitudinal depression extending the length of the bottom of the tray; and wherein the support tray is downwardly sloped from the feed to the catchment end. In the preferred embodiment, the system includes a catchment tray supported to extend below the catchment end of the support tray, the catchment tray including an outlet.

GENERAL DESCRIPTION

In nutrient film growth technology, series of plants are generally contained within a growth container which is supported on an elongated tray. A small nutrient stream is introduced at one end of the container and, by virtue of the tray being sloped from inlet to outlet, the nutrient stream flows along the bottom of the container to contact the bottom of the root system or growth cube, preferably a rock wool cube, in which each plant is imbedded. The present invention is not concerned with the metering or introduction of the nutrient stream to the growth container. Rather, it is assumed that the proper amount of nutrient solution is introduced at a suitable flow rate to the inlet end of a growth container.

It is crucial to the efficient operation of the nutrient film growth system that the nutrient stream contact all of the root systems or growth cubes in the growth container and do so as uniformly as possible. To date very substantial problems have existed in achieving this uniform distribution objective. A key consideration in the shortcomings of earlier systems in this respect is the control on the slope of the plant support trays. Along the length of the support tray a uniform slope is very important. Transversely of the support tray, however, it is equally important that there be no slope at all. The present invention provides a framework for support of the plant support trays which is readily adjustable over a continuous range in order to accurately set the required slope longitudinally and to eliminate transverse slope to as great an extent as possible. In the preferred embodiment this framework is comprised entirely of standard polyvinyl chloride pipe. In that embodiment a pair of pipes are laid along the floor or supporting surface to form a pair of parallel rails and include a series of standard T-fittings. The T-fittings contain upright pipe members. The uprights are arranged at spaced intervals positioned to form pairs of uprights as between the two rails. A horizontal member is secured across the top of the uprights. In the preferred case the uprights in fact comprise a pair of telescoping pipe sections which allow the individual uprights to be adjusted over a range of heights. By utilizing a self-tapping screw to set the height of the telescoping members, exact heights can be set for the individual uprights. This will ensure to a great extent that there is no transverse slope on a tray set onto the cross members.

Notwithstanding the care taken in adjusting the framework to control the slope of the plant support trays, various factors may come into play which would result in small unwanted slopes developing in the trays which influence nutrient solution flow and result in dry spots in the system.

An initial step in avoiding these dry spots is to utilize a capillary mat, which might be equated with a blotter, under the plants and along the bottom of the plant container. The mat or blotter will have the effect of distributing the nutrient solution. In general, however, the capillary mat will serve primarily to provide a uniform distribution of the nutrient solution in areas adjacent to the nutrient stream. The limit on the capillary action or drawing power of the mat is such that it will not serve to move the nutrient solution into the fairly large dry areas that are created by minor deviations in slope.

Accordingly, the present invention includes a plant support tray, the support surface of which is specifically profiled to enhance nutrient solution spread and avoid dry areas. To achieve this object the tray is provided with longitudinal grooves or channels, preferably of a rounded or semi-circular configuration, at spaced intervals across the trays. When the plant container containing the plants and preferably the capillary mat is placed in the tray, the bottom of the container, including the capillary mat and to some extent the growth cubes or root systems conform in some measure to the bottom channels, provided that the nutrient solution at the inlet end is spread across the entire width of the bottom of the growth container, some of the nutrient solution will follow the channels to the outlet end of the trays, since any deviations in slope will clearly not be sufficient to cause all or even a significant part of nutrient solution in the channels to drain out laterally. The capillary mats which have conformed to the profile of the tray bottom will then be assured of picking up nutrient solution from each of the channels throughout the length of the trays. If the channel spacing is chosen to be no more than double the distance over which the mat can draw the nutrient solution, then spread of the nutrient solution across the entire tray is assured. This is because a point midway between two of the channels will be at most a distance equal to the drawing distance of the capillary mat from the two channels.

By this means the substantial problem of dry spots or areas is eliminated and uniform and healthy plant growth can be achieved. The importance of this factor cannot be overemphasized.

The overall growth structure is completed by the use of end caps at both ends of the growth trays and an excess nutrient solution removal system.

The plant container for use in the trays of the invention is normally simply a polyethylene sheet which is laid under the plants and then folded up and fastened around the plant stems. The ends of the container are thus open. In the present invention a cap is provided for the inlet end of the trays which serves to prevent leakage at the inlet end of the container. Thus, the container can simply be rolled up to close the end and the tray end cap applied over the end of the tray to prevent unrolling of the end of the container.

At the outlet end of the trays, a collecting basin is provided preferably with a bottom outlet. In the preferred case the trays of the present invention are utilized in pairs so that two growth trays would be positioned between each aisle in a greenhouse. The plants in the two trays would normally be at different stages of development and thus receiving and utilizing different amounts and composition of nutrient solution. Two separate recovery systems are therefore necessary for recovery of the excess nutrient solution. As well, a greenhouse structure may contain a substantial number of these double plant rows. In this situation the outlets from the two collection basins at each pair of trays are staggered in a direction longitudinally of the trays. Thus, a pair of collection pipes for the different nutrient solutions can be run along the end of the series of rows of trays with outlet pipes between the collecting basins and the collection pipes dropping straight from the outlet to the collection pipe. This provides a very substantial economic benefit in that no elbows or other fittings are required to direct the excess solution from the collection basin to the collection pipe.

The straight drop arrangement also avoids problems which could otherwise be caused by plant refuse getting into and clogging elbow fittings.

The benefit is further enhanced by providing a fitting-free connection between the outlet pipe and the collection pipe. Thus, a hole of circular cross section is drilled into the collection pipe directly below the collection basin outlet. The outlet pipe is then fitted over a short sleeve at the outlet and inserted through the hole into the collection pipe. A self tapping screw is then inserted at an angle through the collection pipe and into the outlet pipe to secure the outlet pipe vertically with the bottom of the outlet pipe extending only a short distance into the collection pipe.

To provide vertical support for the collection pipe while avoiding obstruction of the collection pipe, the outlet pipe is alternatively deeply notched at the bottom thereof to allow relatively unobstructed flow through the collection pipe while leaving a pair of support legs for the outlet pipe. Since a commercial operation will involve a very large number of rows of growth trays, the number of fittings that is rendered unnecessary by these alternative excess nutrient solution collection systems is economically very significant.

The first of these alternative arrangements is preferred for economic reasons in that the high labour cost involved in notching the outlet pipe is avoided.

The system thus provides a nutrient film distribution arrangement and excess collection system which offers substantial advantages in technical and economic terms.

BRIEF DESCRIPTION OF THE DRAWINGS

In drawings which illustrate embodiments of the invention.

While the invention will be described in conjunction with the illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF PREFERRED EMBODIMENTS

In the following description, similar features in the drawings have been given similar reference numerals.

Figure 1:
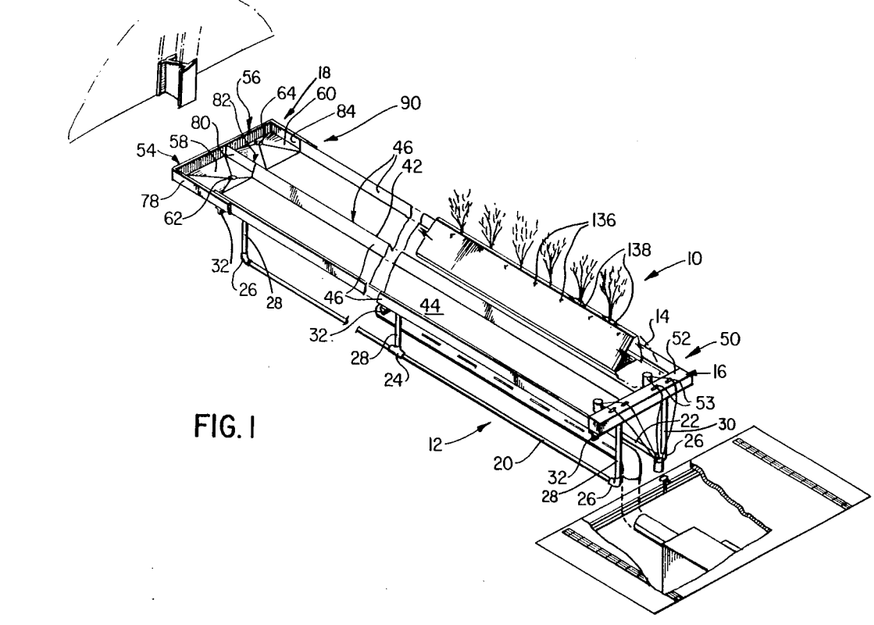
FIG. 1 is a perspective view of a support system for plants in accordance with the invention.

The plant support structure 10 includes the supporting framework 12 and the plant support tray 14. The support tray 14 includes the feeding end cap 16 and the catchment end assembly 18.

The framework 12 comprises a pair of rails 20 and 22 which include a series of T-junctions 24 and terminal elbows 26. A series of pairs of uprights 2B and 30 are secured respectively in rails 20 and 22 by means of the T-junctions 24 and elbows 26. Transverse support members 32 are secured across the top of pairs of uprights 28 and 30. As illustrated, the transverse members 32 are in the form of T-bars.

In cases where additional stability is desired transverse support members (not illustrated) may be introduced between rails 20 and 22. These are suitably in the form of additional T junctions joined by horizontal members.

Figure 2:
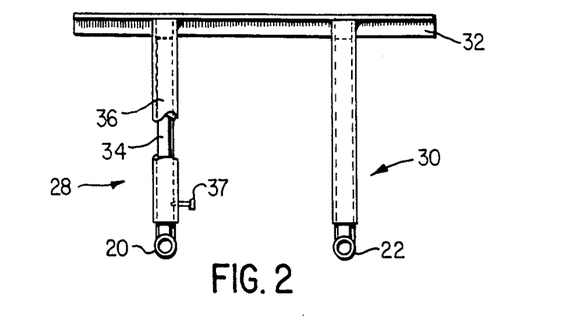
FIG. 2 is an end elevation of a part of a support frame according to the invention.

With reference to FIG. 2, a preferred feature of framework 12 is illustrated. In that case the uprights 28 and 30 each comprise a pair of telescoping elements 34 and 36. The elements 34 are secured in T junctions 24 and elbows 26, and the elements 36 are free to slide vertically along elements 34. In the preferred case the elements are tubular, so that the elements 34 need merely be of smaller diameter than elements 36, in order to achieve the telescoping effect. The transverse support members 32 are then secured to the elements 36.

While a number of the techniques could be used for setting the telescoping elements of the uprights 28 and 32, most of these depending on predrilled holes, the preferred technique differs from these and allows for a continuous range of adjustment rather than a stepped range. Thus, in the preferred case the entire framework 12 is composed of PVC elements, these being readily available and relatively very inexpensive. Where PVC or similar material is used, the height adjustment is preferably by way of self-tapping screws 37 which can be inserted through the elements 34 and 36 at any point to fix the height of the uprights.

The framework 12 can thus readily be adjusted to provide a slope longitudinally of the tray 14 from the feeder end to the catchment end. A typical slope is of the order of 1 in 50. At the same time the uprights within each pair can be adjusted to maintain the tray 14 very close to horizontal across any transverse section.

The spacing between the pairs of uprights longitudinally of the tray 14 is chosen to ensure that tray 14 is not subject to sagging between the transverse support members 32 under the Weight of plant material. Typically the rails 20 and 22 are spaced in the order of 12 inches and the pairs of uprights along the rails in the order of three feet. Such an arrangement will provide adequate support for a plant support tray 14, which, as described below, is in fact a double tray. The length of the tray 14 can be varied over a wide range but in a typical installation might be of the order of 36 feet.

The tray 14 is preferably a double tray unit comprising trays 38 and 40 separated by the barrier 42. Where detail of the trays 38 and 40 is discussed relative to a single tray, it is to be understood that the two sides of the tray are identical and the detail applies to both. The double tray unit 14 may simply be set on the transverse support members 32 without the need for any securing devices. In the preferred case an upright piece 33 (FIG. 12) is secured at the mid-section of members 32 to prevent transverse movement of the tray unit 14 on the supports 32.

Figure 3:
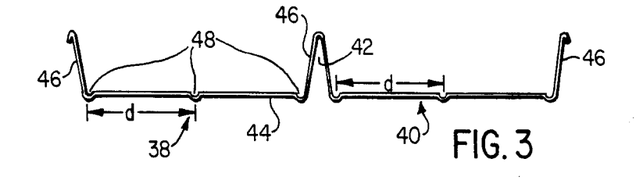
FIG. 3 is a sketch in section across a support tray according to the invention.

With reference to one of the tray sections 38, the section comprises a channel shaped structure having bottom 44 and sidewalls 46. The bottom 44 includes a series of spaced channels 48 extending longitudinally throughout the length of the tray. The channels are preferably of semi-circular cross section and typically of the order of 3/16 of an inch diameter The number of channels 48 and the spacing "d" between the channels depends on several factors and will be discussed below. The Width of the trays 38 and 40 can be varied as desired but is typically in the range of nine to ten inches.

Figure 4:
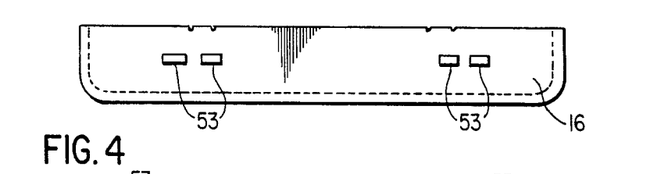
FIG. 4 is a plan view of a feeding end cap according to the invention.
Figure 5:
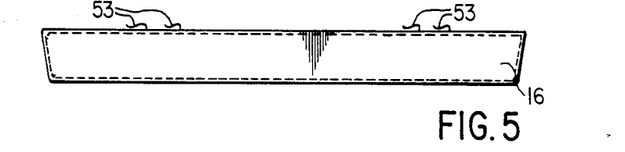
FIG. 5 is an end elevation of the cap of FIG. 4.
Figure 6:
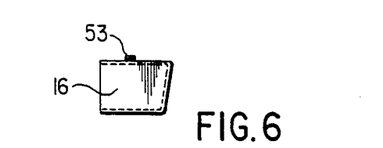
FIG. 6 is a side elevation of a cap according to FIG. 4.

The feeding end 50 of the support tray 14 is preferably provided with a feeding end cap 16. The cap 16 is a short box-like structure which will simply slide over the end 50 of the support tray 14. In the preferred case the end cap 16 includes clips 53 for securing nutrient solution feed lines in position adjacent the feeding end of the structure. Other functional aspects of the cap will be described below.

Figure 7:
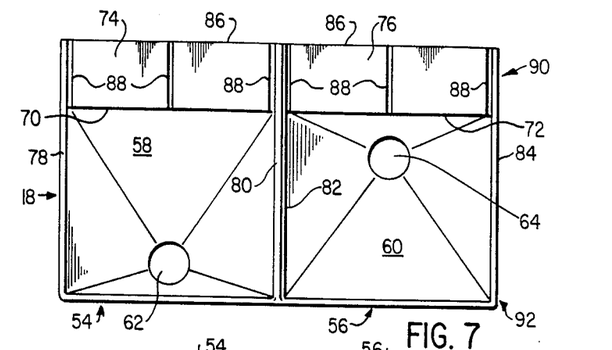
FIG. 7 is a plan view of a catchment end assembly according to the invention.
Figure 8:
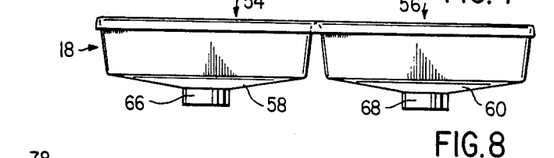
FIG. 8 is an end elevation of the assembly of FIGURE 7.
Figure 9:
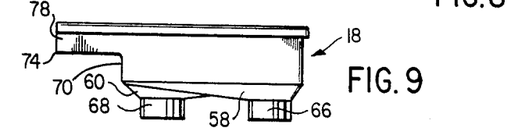
FIG. 9 is a side elevation of the assembly of FIGURE 7.

A pair of catchment trays or basins 54 and 56 are provided for collecting excess nutrient solution at the catchment end of tray 14. The catchment trays 54 and 56 each comprise a box-like structure having bottoms 58 and 60 which are downwardly sloped from the respective sides of trays 54 and 56 toward outlet openings 62 and 64. For reasons which will become apparent later in this discussion, the outlet openings 62 and 64 are offset from each other in the longitudinal direction of the tray 14. The outlet openings 62 and 64 from trays 54 and 56 are provided with short outlet sleeves 66 and 68 respectively.

Catchment trays 54 and 56 are preferably joined as integral parts of a single catchment unit.

On the side of catchment trays 54 and 56 toward tray 14, the sides 70 and 72 are truncated and outwardly extending shelves 74 and 76 are provided. Sides 78 and 80, and sides 82 and 84 of trays 54 and 56 respectively extend out to the edge 86 of shelves 74 and 76.

The shelves 74 and 76 are provided with channels 88. In use the shelves 74 and 76 are slid under the trays 38 and 40 with the channels 88 preferably mating with the channels 48. This mating function is merely for stability. The shelves 74 and 76 are inserted on top of an end transverse support member 32 and the end 90 of the trays 54 and 56 is supported thereby.

Support for the outer end 92 is not strictly necessary but one support method Will be hereinafter discussed.

The overlapping arrangement of the support tray 14 with the catchment trays 54 and 56 is illustrated in FIG. 1 and ensures that there will be no backflow of nutrient solution between the bottom 44 of trays 38 and 40 and the shelves 74 and 76. Rather, excess nutrient solution will simply drop into the catchment trays 54 and 56 and be carried by gravity toward the outlet openings 62 and 64.

Figure 10:
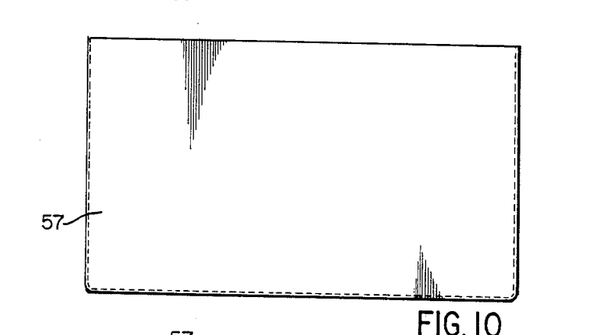
FIG. 10 is a top plan view of a catchment end cap according to the invention.
Figure 11:
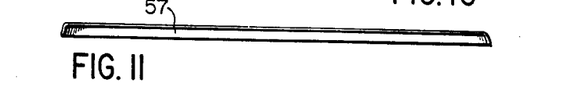
FIG. 11 is an end elevation of the cap of FIG. 8.

The catchment trays 54 and 56 are preferably provided with a single cover or cap 57 which snap fits over the trays 54 and 56 to avoid ingress of contaminants and to reduce algae growth by reducing available light.

Figure 13:
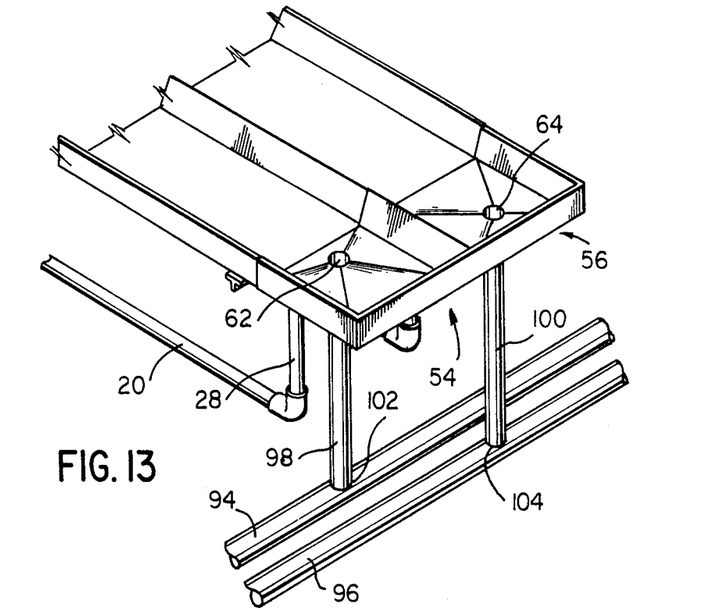
FIG. 13 is a perspective view of catchment end outlet piping according to the invention.

The offset arrangement of the outlet openings 62 and 64 provides substantial economic benefits. In practice there will normally be a substantial number of support trays 14 arranged side by side and separated by working aisles. In the preferred case the dual tray system will be used for rotation. such that a series of trays 38 will contain plants of a given degree of maturity and a series of trays 40 will contain plants of a different degree of maturity. The plants in the two groups may require different nutrient solution composition and amounts. That being the case, dual recovery systems are necessary for recovery of excess nutrient solution. Because of the offset arrangement of the outlets 62 and 64, collection pipes 94 and 96 can be run in parallel beneath the ends of any number of side by side assemblies 10 without requiring any elbows or the like fixtures to direct recovered solution from the trays 54 and 56 to respective ones of pipes 94 and 96. Rather, the collection can be achieved simply by the use of a pair of outlet pipes 98 and 100.

Figure 14:
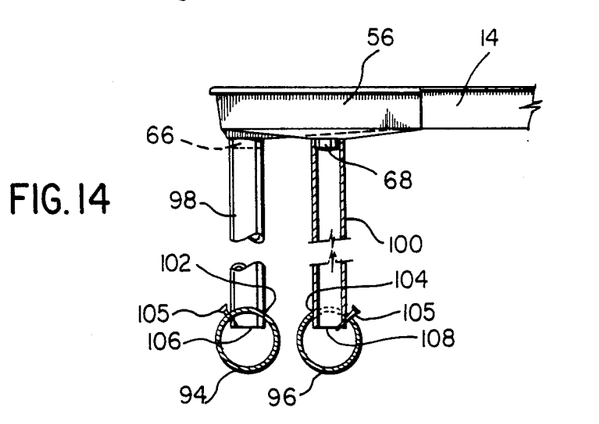
FIG. 14 is a cross section through outlet piping according to the invention.

Furthermore, to reduce the requirement for fittings and consequently costs, unique connection system has been developed for use as between the outlets 62 and 64 and the collection pipes 94 and 96. For obvious reasons the collection pipes 94 and 96 will be of greater diameter than the outlet pipes 98 and 100. Typically the latter might be two inch where the former are four inch pipe. Openings of circular cross section 102 and 104 are made in pipes 94 and 96. The outlet pipes 98 and 100 are then positioned with their upper ends over sleeves 66 and 68 respectively and their lower ends 106 and 108 extend a short distance through the openings 102 and 104 respectively. Self-tapping screws 105 are then inserted at a suitable angle through the walls of collection pipes 94 and 96 and into outlet pipes 98 and 100 adjacent the ends 106 and 108. The screws 105 thus serve to secure the outlet pipes 98 and 100 in position to avoid significantly obstructing collection pipes 94 and 96.

In an alternative embodiment (not illustrated) the length of the outlet pipes 98 and 100 is chosen to extend from the bottoms 58 and 60 of catchment trays 54 and 56 (slid over outlet sleeves 66 and 68) to the point where the bottoms 106 and 108 of pipes 98 and 100 abut against the lower inner walls of pipes 94 and 96. The outlet pipes 98 and 100 are thus vertically supported and ar prevented from slipping off sleeve 66 and 68 and also serve to provide some support for catchment trays 54 and 56.

In order to avoid blockage of flow in this alternative through the collection pipes 94 and 96, the outlet pipes 98 and 100 are deeply notched at their bottoms 106 and 108 to form inverted U-shaped notches. These notches effectively create a pairs of legs at the bottom of outlet pipes 98 and 100 respectively which legs present a very thin profile and little obstruction to flow through collection pipes 94 and 96.

Figure 12:
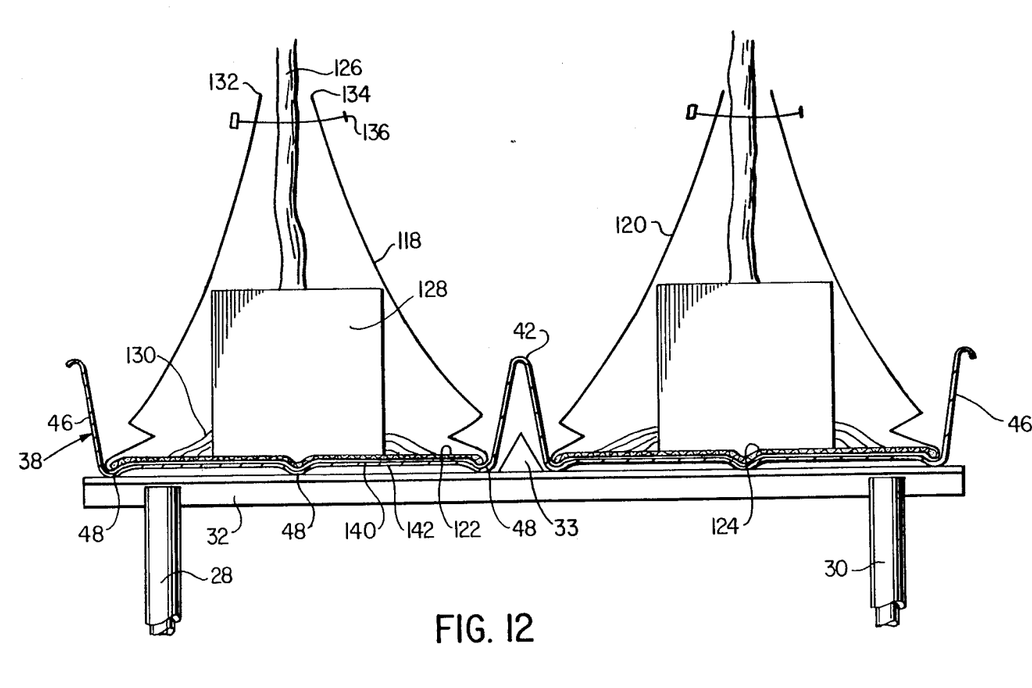
FIG. 12 is a cross sectional sketch of the support system of the present invention including plant containers and plants.

With reference to FIG. 12, plant containers 118 and 120 are illustrated within the trays 38 and 40 respectively. The containers 118 and 120 comprise flexible sheets, preferably polyethylene, which are stretched longitudinally along the trays 38 and 40. On top of each of the sheets and again extending along the trays 38 and 40 are placed capillary mats (which may be considered to act as blotters) 122 and 124. On top of the mats 122 and 124 are placed a series of plants 126 having root systems which are preferably, although not necessarily, generally encased within the growth cube (such as a rock wool cube) 128, part of the root system 130 of the plants 126 may initially extend out of the growth cube and will do more so as growth proceeds.

The structure and operation of the two containers 118 and 120 is the same, so the following discussion will proceed with reference only to container 118.

Once the plants 126 have been placed in container 118, the edges 132 and 134 of the container are folded up and clipped together by clips 136, leaving spaces 138 (FIG. 1) around the plants. The feeding end of the container 118 is rolled up to prevent leakage and the feeding end cap 16 is placed over the rolled up end of the container to prevent unrolling.

The bottom 140 of container 118, along with the mat 122 and part of the root system 130 will tend to collapse into the channels 48 in the tray 38. Nutrient feed solution is introduced inside the container 118 at the feed end and flows along the container, sloped with the tray 38, toward the catchment end. The volume of nutrient solution introduced at the feeding end will generally be adequate to ensure its spread across the entire width of container 118. As this spreading effect takes place at the feeding end, some of the nutrient solution will tend to collect in longitudinal depressions in the bottom 140 of container 118 created by the partial collapse noted above of the container 118 into the channels 48.

At this point the number and spacing of channels 48 becomes of substantial importance. The effect of nutrient solution flowing down the depressions in channels 48 and the partial collapse or bulging of mat 122 into the channels will ensure that nutrient solution will reach the capillary mat at least along continuous lines corresponding to those depressions. Accordingly, the spacing of the channels 48 is chosen so that the drawing power or the tendency of solution to be taken up into the mat 122 is such as to carry nutrient solution to a point at least half way between each pair of channels 48. Thus, a point 142 midway between two of the channels 48 will by virtue of the drawing power of the mat receive nutrient solution from both of the adjacent channels 48. In that way the entirety of the root systems of the plants will receive adequate and reasonably uniform amounts of nutrient solution.

It is therefore the case that the number and spacing of the channels will depend on the width of the tray 38 and the characteristics of the mat 122.

It should be emphasized that the levelling devices incorporate in the framework 12 are meant to ensure to as great an extent as possible that the trays have no transverse slopes so that nutrient solution would be delivered to a large part of the root system 130 without the necessity for channels 48. Nonetheless, it is very difficult to take into account all factors which will influence the flow of the nutrient film along the bottom of the container 118 and, accordingly the channels are included to ensure that areas which might otherwise remain dry will receive their share of nutrient solution.

Excess solution then simply flows out of the catchment end of the container 118 and into the catchment tray 54 for reclamation.

Thus it is apparent that there has been provided in accordance with the invention a support system for growing plants that fully satisfies the objects, aims and advantages set forth above. While the invent on has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. A support system for growing plants comprising:
a supporting framework;
at least one elongated support tray sloped downwardly from a feed end to a catchment end on said framework, said support tray comprising a flat horizontally disposed bottom and a pair of side walls defining a channel shape of substantially horizontal transverse profile and having a least one longitudinal depression extending the length of said bottom for flow of a nutrient solution therein from said feed end toward said catchment end;
a catchment tray supported to extend below said catchment end of said support tray, said catchment tray including an outlet.

2. The system of claim 1 in which said framework comprises a pair of spaced substantially parallel lower rails; a series of upright members at spaced intervals along said rails; said members on one said rail forming pairs with corresponding ones of said members on the other said rail; and horizontal members secured across the top of each said pair of upright members.

3. The system of claim 2 in which said pairs of uprights are of decreasing length between said feeding end and said catchment end of said support tray.

4. The system of claim 3 in which said uprights give to said at least one support tray a slope of about 1 in 50.

5. The system of claim 2 in which said rails and said uprights are polyvinyl chloride pipe, and said uprights are joined to said rails by T-junctions.

6. The system of claim 2 in which said uprights comprise a pair of telescoping members which are selectively positionable over a preselected height range.

7. The system of claim 6 in which said uprights are selectively positioned to be of decreasing height between said feed end and said catchment end.

8. The system of claim 7 in which said uprights give to said at least one support tray a slope of about 1 in 50.

9. The system of claim 1 in which said catchment tray includes a profiled bottom sloped toward said outlet opening; and a series of raised sides around said bottom; and wherein one said side is truncated and includes extending therefrom a shelf adapted to receive thereon the said catchment end of said support tray.

10. The system of claim 9 including a catchment tray cover disposed over said catchment tray.

11. The system of claim 1 including an end cap disposed over said feeding end of said support tray.

12. The system of claim 1 in which said support tray includes three said longitudinal depressions in co-planar relation.

13. The system of claim 12 in which one said depression lies centrally of the bottom of said support tray and the other two depressions lie in the outer extremities of said bottom.

14. The system of claim 1 including two said support trays in parallel an said framework, said two trays integrally joined longitudinally by a central raised wall.

15. The system of claim 14 including one said catchment tray associated with each said support tray, and wherein the outlets of said catchment trays are in the bottoms thereof and are staggered relative to each other in the longitudinal direction of said support trays.

16. The system of claim 15 in which said outlets are circular and include a short sleeve extending below said catchment trays; and wherein said system includes a pair of collection pipes running transversely of said catchment trays below said outlets, openings in said pipes of circular cross section below said outlets, and outlet pipes fitted over said sleeves and extending into said openings and resting against the opposite side of said collection pipes.

17. The system of claim 16 in which said outlet pipes are deeply notched at the ends thereof within said collection pipes to thereby minimize resistance to flow within said collection pipes.

18. The system of claim 1 wherein said system includes within each said support tray an elongated flexible enclosure containing along the bottom thereof a flexible capillary mat, a series of growth support cubes on said mat, and a series of plants embedded within said cubes, said enclosure having openings at the top thereof through which the stems of said plants extend.

19. In a support system for growing plants, the combination comprising
a supporting framework;
at least one elongated support tray sloped downwardly from a feed end to a catchment end on said framework, said tray including a flat horizontally disposed bottom having a plurality of longitudinally disposed depressions for conveying nutrient solution therein and a pair of side walls; and
a flexible capillary mat on said bottom of said tray for receiving plants thereon, said mat being disposed over each said depression in said bottom to receive nutrient solution therefrom.

20. The combination as set forth in claim 19 which further comprises a feeding end cap on said feed end of said tray for securing nutrient solution feed lines there at and a catchment tray on said catchment end of said tray for receiving excess nutrient solution.

21. The combination as set forth in claim 20 which further comprises a cover over said catchment tray to reduce light and algae.

22. The combination as set forth in claim 19 wherein said framework includes a plurality of longitudinally spaced pairs of vertically disposed telescoping members for adjusting the height of said tray thereat.

* * * * *